United States Patent [19]

Mumbower

[11] Patent Number: 4,845,392

[45] Date of Patent: Jul. 4, 1989

[54] HYBRID LINEAR ACTUATOR

[75] Inventor: Alan L. Mumbower, Round Lake Beach, Ill.

[73] Assignee: Eaton Corporation, Cleveland, Ohio

[21] Appl. No.: 473,888

[22] Filed: Mar. 10, 1983

[51] Int. Cl.[4] .......... H02K 41/00

[52] U.S. Cl. .......... 310/14

[58] Field of Search .......... 310/12–14, 310/30, 306, 17, 16

[56] References Cited

U.S. PATENT DOCUMENTS

| | | | |
|---|---|---|---|
| 3,022,450 | 2/1962 | Chase, Jr. | 310/30 UX |
| 3,103,603 | 9/1963 | Reutter | 310/30 |
| 3,184,622 | 5/1965 | Levine | 310/30 |
| 3,241,006 | 3/1966 | Boyko | 310/14 X |
| 3,740,594 | 6/1973 | Casey | 310/30 |
| 4,127,835 | 11/1978 | Knutson | 310/30 X |
| 4,243,899 | 1/1981 | Jaffe | 310/14 |

*Primary Examiner*—Donovan F. Duggan
*Attorney, Agent, or Firm*—R. A. Johnston

[57] ABSTRACT

A linear actuator is a hybrid in that movement of the armature is influenced by the field of permanent magnets and the field of a coil when it is energized by direct current. The coil is fixed in a ferromagnetic shell and a pair of permanent magnets are fixed in the shell axially of the coil. The armature has a reduced diameter tip or end which is influenced by the magnets when the coil is deenergized and which enables the force on the armature to remain generally uniform over the working stroke of the armature. The linear actuator is shown operating a sleeve valve spring biased to closed position and opened relative to the metering cone by application of direct current to the coil. The effective magnitude of the current determines how much the valve opens.

13 Claims, 2 Drawing Sheets

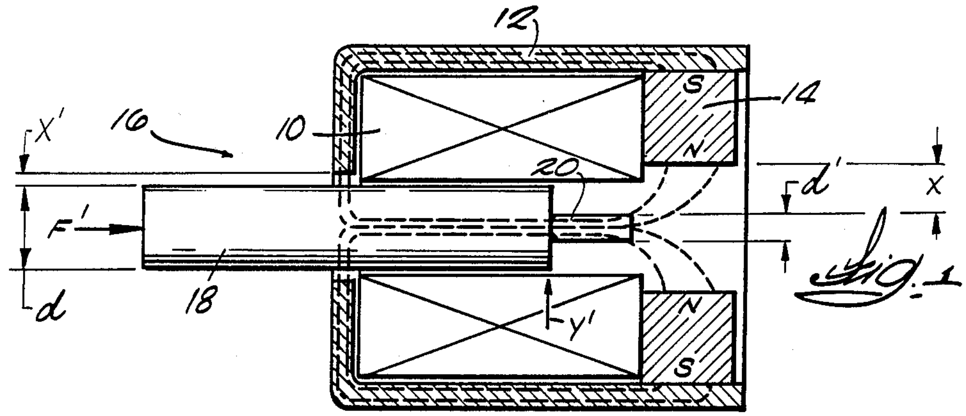
Fig. 1
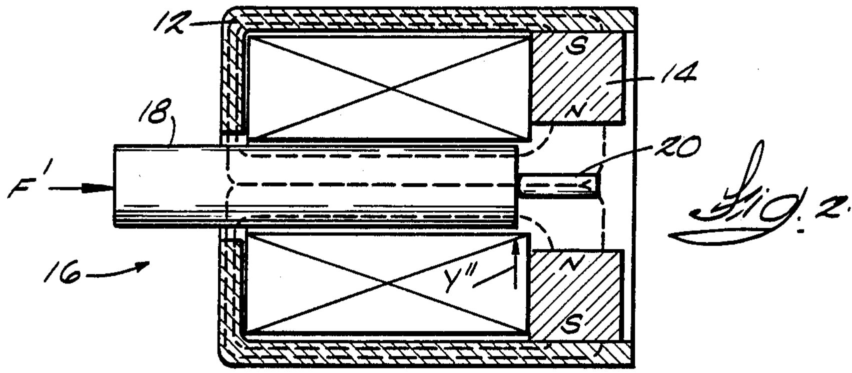
Fig. 2
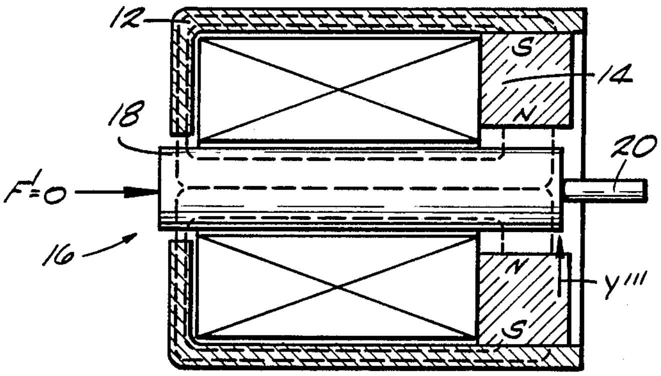
Fig. 3
Fig. 4
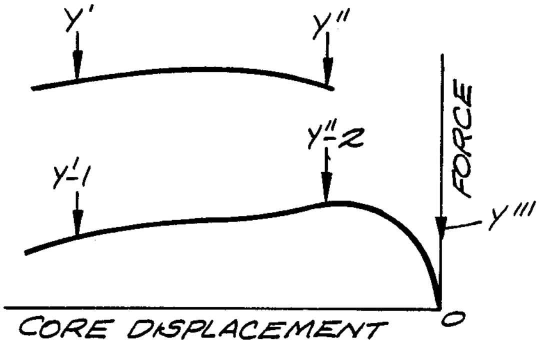

HYBRID LINEAR ACTUATOR

DESCRIPTION

BACKGROUND OF THE INVENTION

This invention relates to DC linear actuators. There are basically two types of linear actuators, the most familiar being a ferromagnetic clad DC solenoid having a ferromagnetic core surrounded by a fixed coil within a ferromagnetic housing. The core is drawn into the coil and approaches and usually contacts a fixed stop or pole piece projecting into the coil opening from one end of the coil. When the coil is energized the armature or core is drawn into the coil and does the desired work. The force exerted on the armature increases as the air gap between the armature and the fixed pole piece decreases. Such solenoids are useful where the load is moved over a fixed distance or stroke, but become less attractive when the stroke must be varied. At that point, the solenoid cannot be used effectively.

The other kind of DC linear actuator is called a moving coil linear actuator which has a magnet fixed in a ferromagnetic shell and a ferromagnetic core. A movable coil is situated between the magnet and the core and moves relative to the magnet as the current in the coil is varied. Coil movement results in requiring very flexible lead wires or brushes to connect the coil to a DC electrical source. This can be costly and results in mechanical losses (or resistance to movement) which affects response of the coil. In order to get a long stroke, it is necessary to use long magnets and these are expensive. The mechanical work is accomplished by axial coil movement and the mass of the coil affects the output force and response time with the result that some applications limit the physical size of the coil and this in turn places restrictions on heat dissipation and limits the power handling capability of the coil and the structure. The advantage of the moving coil, however, is that it has a reasonably uniform force over the stroke of the coil. This is in contrast to the rapid increase in force on the solenoid type actuator as it approaches the fixed pole piece (i.e., as the air gap decreases).

SUMMARY OF THE INVENTION

The principal object of this invention is to provide a DC linear actuator providing the desirable characteristics of both a moving coil linear actuator and a solenoid. In this construction fixed permanent magnets supplement the magnetic field established by a fixed coil. This results in a linear actuator having higher mechanical output force (i.e., higher than a similar assembly with no permanent magnets) which is essentially constant as the core or armature moves within its designed limitations.

This invention itilizes an armature or core having major and minor diameters to effectively combine the magnetic fields of the coil and of the permanent magnets to result in substantially uniform force. It will be understood that if a uniform force is not desired, the construction would permit variation in diameters, etc., to tailor the force characteristics.

Another object of this invention is to provide a linear actuator having an output force curve similar to a moving coil linear actuator but having a fixed coil and moving armature, thus eliminating the problems associated with brushes or terminating lead wires to a moving coil.

The present invention has the advantage of obtaining the desirable force characteristics mentioned above, while at the same time reducing the length of the magnets, thus reducing the cost of the magnets.

The mass of the present coil does not directly affect output force and response time as in the moving coil linear actuator. Another advantage of this construction is that when the coil is not energized there is force on the armature when the armature is held in a position other than its quiescent position.

BRIEF DESCRIPTION OF THE DRAWINGS

FIG. 1 is a schematic section through a linear actuator according to this invention.

FIG. 2 is similar to FIG. 1 but the armature has been moved to another position.

FIG. 3 is similar to FIGS. 1 and 2 but now the armature has moved to a position which may be considered a quiescent position.

FIG. 4 is a graph where the lower curve shows the force effective on the armature or core in the positions shown in FIGS. 1, 2 and 3 with no current applied to the coil and the upper curve shows the force on the core when it moves from the position of FIG. 1 to the position of FIG. 2 with current applied to the coil.

DETAILED DESCRIPTION OF THE DRAWINGS

Figure 5:
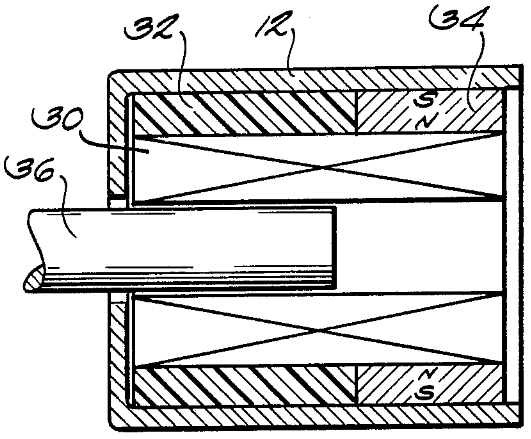
FIG. 5 is a schematic representation of an alternate construction.

FIGS. 1, 2 and 3 can be considered in two ways. This description will first consider each of the drawings as if the coil is not energized so that the magnetic forces established by the permanent magnets alone can be considered. Then we will examine what happens when the coil is energized.

The actuator includes a coil 10 mounted inside the cup-shaped ferromagnetic frame 12 with permanent magnets 14 mounted at the open end of the frame 12. A unitary ferromagnetic armature or core 16 is slidably mounted in the center of this assembly. The armature 16 has a major diameter portion 18 having a diameter d and a small projecting portion 20 having a smaller diameter d'. The magnets 14 are oriented so the lines of induction pass through air gap X to the core projection 20, then through the core 18 to the frame or shell 12 through air gap X', then through the shell 12 to the magnet structure 14, all as illustrated in FIG. 1. The purpose of the small diameter projection 20 having the dimension d' is to mitigate or minimize the change in magnetic induction as the distance between the major diameter portion 18 and the permanent magnets 14 increases. When the coil is not energized and the core is positioned as shown in FIG. 1, the lines of induction produce a mechanical force in the direction F'. As the core 16 moves from the position Y' shown in FIG. 1 to the position Y'' shown in FIG. 2, the mechanical force changes as illustrated in the lower curve of FIG. 4 with the FIG. 1 or Y' value being designated as Y'-1 and the FIG. 2 position value designated as Y''-2 on the lower curve.

In FIG. 2, some magnetic lines pass directly between the major diameter portion 18 and the magnets 14 while some of the lines pass through the minor diameter portion 20 to the magnets 14. It will be apparent that the force F′ increases going from Y′ to Y″ (or from the FIG. 1 to the FIG. 2 position).

If the coil 10 remains deenergized and all restraints are removed from the armature, it will move to the position shown in FIG. 3 which is designated Y‴ in FIG. 4. It can be seen that the force F′ is down to zero. Everything is in balance and the system is quiescent.

When the coil 10 is energized to produce a magnetic field that will reinforce the magnetic field of the permanent magnets 14, the resulting mechanical force on the core (in direction F′) will increase. For example, in the position shown in FIG. 1, combining the magnetic fields results in the force on the core increasing as shown on the upper curve in FIG. 4 and is designated Y′. It is obvious the force is greatly increased. When the core 16 moves to the FIG. 2 position with the coil 10 still energized, the force will follow the upper curve (FIG. 4) from Y′ to Y″. It will be seen that the force is essentially constant assuming the length and diameter of the core dimensions d and d′ are proportioned to effectively combine the magnetic fields of the coil 10 and the permanent magnets 14. It may be noted that the reduced diameter portion 20 of the core can be shaped . . . it can be made conical, bell shaped, etc., to shape the force curve to meet the particular needs. For example, if a spring mechanism is provided to restrain the core or act in opposition to the force F′, which spring mechanism has a unique characteristic, the curve could be tailored to substantially match that characteristic. If the polarity of the coil is reversed, the magnetic field of the coil would oppose the field of the permanent magnets and this would be counter-productive. Therefore, reversal of the magnetic field of the coil should be accompanied by a reversal of the field of the permanent magnets so the two fields will continue to reinforce one another.

Figure 8:
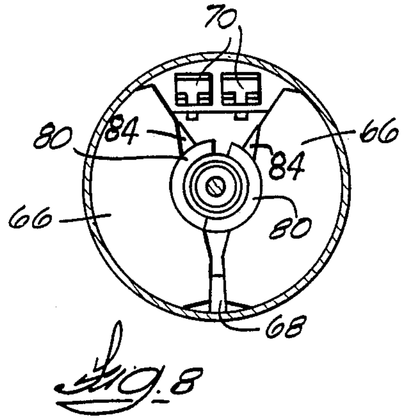
FIG. 8 is a cross section of FIG. 7 taken along the line 8—8.

It may be noted that the permanent magnets 14 need not embrace 360° but embracing less than 360° can have some effect on the characteristics which may call for other design modifications. If, as may be seen in FIG. 8, the magnets occupy less than 360° to make room for connections to the coil, then ferromagnetic pole pieces embracing 360° can be placed in the gap X (like gap X shown in FIG. 1) to, in effect, apply a magnetic field over 360° even though the magnets do not embrace 360°. This will leave an open pie-shaped segment for electrical connections to the coil.

FIG. 5 shows another embodiment which has been proven in the laboratory to be effective but is less desirable because it costs more. Here the coil 30 is fixed inside the frame 12 with a nonmagnetic spacer 32 outside the coil and a magnet 34 also outside the coil. The armature 36 continues to reciprocate within the center. This will have force characteristics similar to the preferred embodiment.

Figure 6:
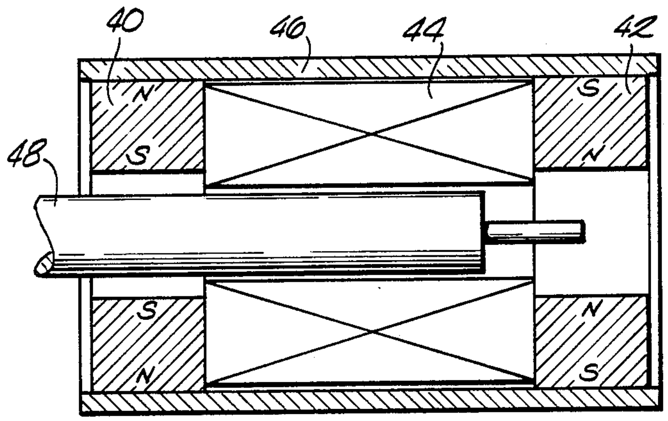
FIG. 6 is a schematic representation of still another embodiment.

The embodiment shown in FIG. 6 has some resemblance to the preferred embodiment shown in FIG. 1, but here there are magnets 40, 42 at either end of the coil 44 within the tubular frame 46. The shape of core or armature 48 is similar to that shown in the preferred embodiment. It will be noted that the polarization of the magnets 40, 42 is opposite so the magnetic lines do not buck or oppose each other. This construction also has a strong and reasonably flat force curve but obviously costs more than the preferred embodiment.

The hybrid actuator eliminates the mechanical losses associated with connecting a moving coil to the power source via lead wires or brushes. The magnets are shorter in the axial direction and this reduces cost appreciably. The mass of the coil does not directly affect output force or response time as in moving coil arrangements. Clearly, the force characteristic is considerably more uniform than with solenoids and is equal or superior to moving coil designs. Finally, a distinct advantage is that there is force on the armature even when the coil is deenergized (assuming the armature is not in its quiescent position shown in FIG. 3). This has great utility in many applications. The present design has higher mechanical output force (higher than a similar assembly with no permanent magnets) due to the additive effect of the coil and the magnetic field. This construction can be used in place of moving coil actuators and can be used to precisely position an object or control in accordance with applied current or the width of modulated current pulses. The force characteristics are clearly superior over anything in the prior art in long stroke applications requiring high mechanical force over the entire stroke. And finally, since the moving mass is greatly reduced, the response time is superior.

Figure 7:
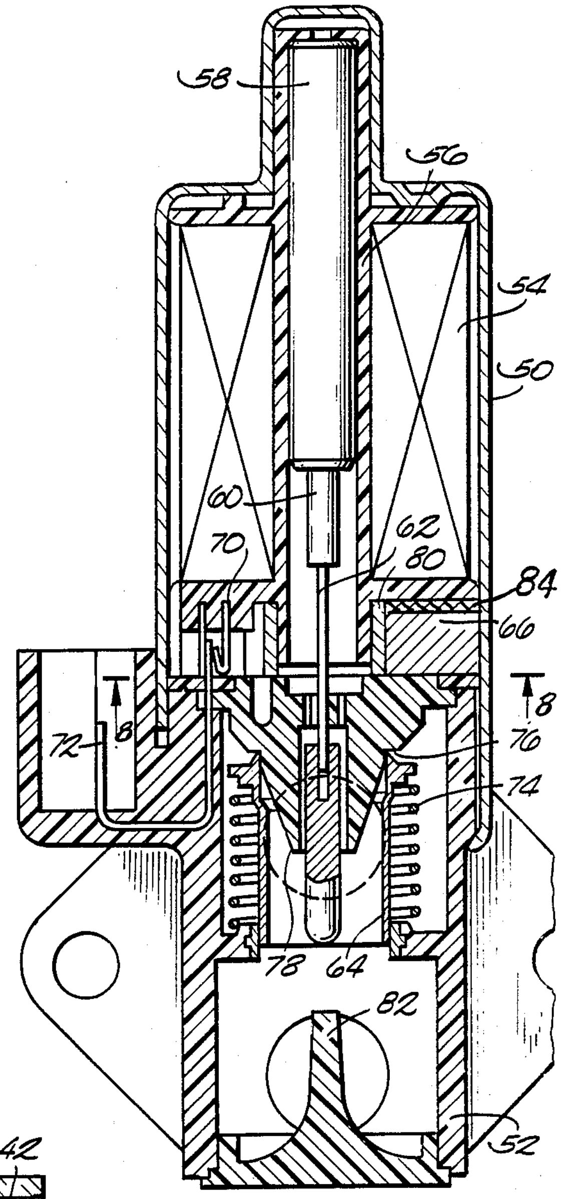
FIG. 7 shows a device using the linear actuator.

FIG. 7 shows the linear actuator operating an air valve. The actuator is enclosed in a ferromagnetic shell 50 which is connected to the air valve body 52. The coil 54 is wound on a plastic bobbin 56 which also serves as a guide for armature 58 having a small end 60 bearing on the nonmagnetic valve stem 62 carried by sleeve valve 64. A pair of generally semi-annular magnets 66 fit inside the shell 50 axially spaced from the coil 54 and have their closely spaced ends separated by the plastic spacer 68 while their other ends are spaced far enough to accommodate the connectors 70 which connect the coil 54 to the terminals 72. Compressed spring 74 biases the valve 64 to seat 76. When the coil 54 is energized it will open the valve relative to the metering cone 78. Further details of valve operation are not relevant to the present invention.

It will be noted pole pieces 80, 80 are provided to bring the magnetic field of the permanent magnets 66 closer to the armature 58 and to embrace 360°. The valve movement in the opening direction is limited by stop 82. If the stop 82 was omitted, the armature movement would be limited by the spring 74 since movement towards the FIG. 3 position from FIG. 2 would entail a falling force and the spring would eventually balance out the force.

A nickel-iron compensator 84 is located between the magnets 66 and the plastic bobbin flange. The magnetic compensator 84 is fabricated as one piece with openings for the electrical connectors 70 and the plastic spacer 68. The compensator 84 contacts the entire inner surface of the permanent magnets 66 so that some of magnetic field is shunted through the compensator. The amount of shunting is principally dependent upon material composition and temperature (the magnetic properties of the compensator material change with temperature). The purpose of the compensator 84 is to minimize the change in actuator force (in direction F′) when the entire actuator and air valve assembly (FIG. 7) is subjected to hot or cold ambient temperatures. Without compensation the actuator force varies considerably as the ambient temperature varies between cold and hot. With compensation the mechanical force decreases but remains substantially uniform as the ambient temperature varies (with the same coil current). This magnetic compensation can also be applied to the embodiments shown in FIGS. 5 and 6. Additionally, the compensator shown in FIG. 7 could have been placed on the outer surface of the magnets (along line 8—8) with similar results.

In all views a pair of magnets are shown (14 in FIG. 1, for example). These are simpler to magnetize than one annular magnet would be. The effect is the same.

The invention has been described applied to an enclosed cylindrical design. The actuator can have an open frame, or a geometry that is square, rectangular, etc. However, such an alternate construction will affect the characteristics which would require some additional design considerations.

I claim:

1. An actuator comprising:

a ferromagnetic frame having an open end;

an electrical coil fixed in the frame;

a magnet fixed within and in contact with the frame adjacent the open end thereof;

a ferromagnetic armature axially movable in the magnetic field of the coil and magnet, said armature being shaped so that force on the armature remains substantially uniform over its stroke;

wherein said magnet is magnetized in a direction transverse to the armature axis.

2. An actuator according to claim 1 in which the magnet exerts force on the armature over the entire stroke of the armature, the field of the coil being additive to the field of the magnet.

3. An actuator according to claim 2 in which the axial center of the magnet is axially spaced relative to the axial center of the coil.

4. An actuator according to claim 2 in which the magnet is axially spaced relative to the coil and the armature has a reduced diameter end closer to the magnet.

5. An actuator according to claim 4 further including:

a spring acting on the armature in opposition to the magnetic force; and means positioned by the armature in response to DC current applied to the coil.

6. An actuator comprising:

a ferromagnetic frame having an open end;

an electrical coil fixed in the frame;

a pair of permanent magnets fixed within and in contact with the frame adjacent the open end thereof and axially spaced from the axial center of the coil and having the same polarity facing the axis; and a ferromagnetic armature movable axially of the coil and the magnets between fixed limits.

7. An actuator according to claim 6 in which the end of the armature closer to the magnets is shaped to result in a magnetic force acting on the armature (when the coil is deenergized) which is different from that which would prevail if the armature had a uniform cross section throughout its length.

8. An actuator according to claim 6 in which the armature has a uniform cross section over most of its length and has a reduced cross section at the end closer to the permanent magnets.

9. An actuator according to claim 6 in which the cross section of the armature is reduced at the end nearer the magnets and is shaped to result in a substantially uniform force acting on the armature in any axial position of the armature during energization of the coil.

10. An actuator according to claim 6 further including a compensator contacting both permanent magnets to shunt some of the magnetic field and render the combined force on the armature more uniform as ambient temperature varies.

11. An actuator comprising:

a ferromagnetic shell having an open end;

a coil fixed in the shell;

a pair of permanent magnets fixed within and in contact with the shell adjacent the open end thereof axially of the coil an with an opening between the magnets in alignment with the central opening of the coil, the magnets being polarized so similar poles of each magnet face the axis and the coil being adapted for energization by direct current to develop a field which is additive to the field of the permanent magnets;

a ferromagnetic armature axially movable on the axis of the coil and the magnets, the tip of the armature nearer the magnets being reduced; and spring means opposing movement of the armature in the direction it moves when the coil is energized.

12. An actuator according to claim 11 further including semi-cylindrical pole pieces inside said magnets between the magnets and the armature.

13. An actuator according to claim 12 further including a compensator contacting both permanent magnets to shunt some of the magnetic field and render the combined force on the armaturer more uniform as ambient temperature varies.

* * * * *